United States Patent Office 2,782,975
Patented Feb. 26, 1957

2,782,975

SPRAYABLE AMORPHOUS ANTIBIOTIC COMPOSITION, PRESSURIZED CONTAINER WITH SAME, AND METHOD OF PREPARING

John Cecil Bird, Pearl River, N. Y., assignor to American Cyanamid Company, New York, N. Y., a corporation of Maine No Drawing. Application April 20, 1955, Serial No. 502,739

11 Claims. (Cl. 141—392)

This invention relates to a sprayable antibiotic composition.

Modern antibiotics are finding increased utility in many phases of treatment of animals and humans. Many antibiotics have been primarily administered by injection or orally. It is desirable in many instances to be able to apply an antibiotic topically to various areas. This includes specialized areas such as the eyes, as well as in general to large surfaces such as the surface of the skin. For application to the eye, most antibiotic ophthalmic preparations have been used in the form of ointments based upon petrolatum and are consequently somewhat water repellant. This caused some difficulty in application and also delayed absorption, as the eye surface is normally coated by aqueous fluids.

When the skin is irritated, as for example by a serious burn or abrasion, the spreading of the antibiotic on the surface presents problems. Desirably, the antibiotic should be spread with as little disturbance to the area as possible and should be capable of being applied at any desired rate. For the treatment of various dermal, ocular, and mucous membrane infections or injuries, these requirements have presented serious problems.

Spraying the antibiotic on the surface would appear to be desirable. Unfortunately a sprayable composition is not readily devised. If a pressure spray container is assembled using chlortetracycline hydrochloride, for example, the crystalline nature of the material causes a mat of needles to form in the spray orifice, and quickly clogs the discharge valve.

It is therefore an object of this invention to provide a method whereby antibiotics of the tetracycline group, such as tetracycline or chlortetracycline, may be applied by spraying to a selected surface. The antibiotic is present as a calcium salt, with preferably a local anesthetic and preferably a film forming material to bind the antibiotic to the surface to which it is applied. For use in the eye, the film forming material is omitted.

The antibiotic for use in such a pressurized container must be a substantially amorphous material. Crystalline materials, when present as suspended solids in spray containers cause difficulty, because they frequently crystallize in the fine apertures of the valves. This can be the case even with finely subdivided or micronized crystalline substances, as any trace of soluble material will form tiny crystalline aggregates on evaporation of the propellant at the nozzle of the container, thus effectively shutting off the spray. Amorphous materials, if finely divided, are much less subject to clogging and accordingly may be sprayed through smaller orifices satisfactorily.

A suitable method of preparing an antibiotic for use in the spray containers is illustrated by the following example showing the preparation of amorphous calcium chlortetracycline:

A slurry was prepared containing 42.8 kilograms of crystalline chlortetracycline hydrochloride meeting pharmaceutical standards of purity, in 600 liters of pure water. The chlortetracycline did not dissolve, but formed a thin slurry. To this slurry was added 11.9 kilograms of pharmaceutical grade triethanolamine dissolved in 40 liters of water. The mixture was stirred for approximately 20 minutes, thereby converting the chlortetracycline hydrochloride to the neutral or free base form.

The free base does not crystallize under these conditions, but remain essentially amorphous in the slurry. The amorphous form of the free base reacts more rapidly with the calcium ions than does the crystalline form.

Over a period of approximately 30 minutes to the slurry was added, with continous stirring, approximately 4 kilograms of 60 mesh calcium hydroxide, the pH being constantly measured to insure it did not rise about 9.5. 1.91 kilograms more of calcium hydroxide were added with stirring during the next 30 minutes at such a rate that the pH did not exceed 9.5 during the addition.

Whereas the 5.91 kilograms of calcium hydroxide is approximately that required for theoretical consideration, it was found that to keep the pH at more than 8.5, as the mixture was stirred, an additional 2.5 kilograms of calcium hydroxide were required. This was added slowly with stirring until the pH remained at more than 8.5, but less than 9.5. Apparently, part of the calcium hydroxide was required to neutralize carbon dioxide from the air and to check hydrolysis of the calcium chlortetracycline.

The mixture containing the precipitate of calcium chlortetracycline was diluted to 1650 liters with additional water, stirred, and then filtered through a filter press. The separated filter-cake was slurried with 300 liters of water and run through a comminuting mill. The machine used was a Fitzpatrick ointment mill operating at 5,000 revolutions per minute. This thoroughly ground the cake and insured that all particles were completely disintegrated. The mixed slurry was diluted to 1650 liters with water and again calcium hydroxide was added to readjust the pH to 8.5. Approximately 140 grams were required. The slurry was allowed to stand for one-half hour and again filtered through the filter press. The precipitate was again slurried with 300 liters of water, passed through the comminuting mill, diluted to 1650 liters, and the pH again adjusted to 8.5 with calcium hydroxide; again approximately 140 grams being required. The composition was stirred for one-half hour and found to still have a pH of 8.5. The precipitate was separated by means of a filter press, and dried. The precipitate was ground until 95% was less than 5 microns in maximum dimension.

Calcium tetracycline may be prepared in a similar manner.

These calcium salts should be finely divided and dry enough to form a free flowing powder. They may be screened and ground to insure that the degree of subdivision is suitable for spraying. The particles should be less than 15 microns in diameter.

The amorphous salt of the antibiotics prepared as above are readily sprayable.

As a propellant it is preferred to use a mixture of the haloalkanes. Among those which may be used are those sold under the trade name "Freon." The formulae, boiling points and densities of these are as follows:

| Trade name | Formula | Boiling point, °C. | Density at 30° C. |
|---|---|---|---|
| Freon 11 | $CCl_3F$ | +23.77 | 1.464 |
| Freon 12 | $CCl_2F_2$ | −29.80 | 1.293 |
| Freon 21 | $CHCl_2F$ | +8.92 | 1.354 |
| Freon 22 | $CHClF_2$ | −40.80 | 1.175 |
| Freon 113 | $CCl_2FCClF_2$ | +47.57 | 1.553 |
| Freon 114 | $(CClF_2)_2$ | +3.55 | 1.440 |

The haloalkanes may be combined and the combination mixed with the calcium salt of the antibiotic under refrigeration or pressure or preferably, the antibiotic may be mixed with the higher boiling components of the haloalkane mixture and filled into a container. Then to this may be added under refrigeration or pressure the lower boiling components.

During the spraying of insoluble powdered materials, difficulty has been encountered in the settling and packing of the suspensions so that when the valve is first opened the heavy settled material is immediately forced up the dip tube and may clog the valve. This is particularly the case with fine powders which, although settling slowly, form compacted layers at the bottom of the container on long standing so that vigorous shaking does not resuspend them into a satisfactory spray dispersion. Specialized containers and valves have been used in an attempt to avoid such difficulties.

If the calcium antibiotic salt is finely subdivided, so that at least 95% of it is less than five microns in diameter, the rate of settling in certain haloalkanes is extremely slow. Preferably, a mixture of haloalkanes is used such that the specific gravity of the liquid mixture matches insofar as is possible, the density of the powder. If the specific gravity of the liquid is above about 1.37, it is found that the rate of settling of the calcium salt of the antibiotic is so slow that it does not settle over prolonged periods and may be resuspended by slight agitation of the container. A slightly lower specific gravity of propellant may be used if the antibiotic is more finely divided. As a result, for all intents and purposes, by shaking the container before use there is formed a temporarily nonsettling suspension of the solid antibiotic which will allow the application of the antibiotic to extensive surfaces. Such a suspension will readily spray through a .025 inch aperture to form a fine mist. The liquid carrier is almost immediately volatilized and the suspended medicament thus forms an extremely fine dust of high covering power and potency.

The choice of haloalkanes must be such that not only the specific gravity but also the volatility characteristics are satisfactory. Three types of containers are being used at present. (1) A medium-pressure container in which the pressure of the propellant is from about 25 to 45 pounds per square inch gauge; (2) a high-pressure container in which the pressure is above 45 pounds per square inch gauge, which frequently requires specially constructed containers; and (3) a low-pressure container of from 12 to 25 pounds per square inch gauge, which may be used with glass containers which have been recently introduced on the market. The pressures may be measured at 25° C. The choice of the boiling point, which controls the pressure, depends in part upon the type of container and the type of valve which it is desired to use. It is preferred to use a propellant which does not have a greater pressure than 200 pounds per square inch at 130° F. (54.5° C.). It is also preferred to use one which has a vapor pressure of from 38 to 42 pounds per square inch at a temperature of 25° C. Control of the specific gravity and pressure is easily obtained by using a mixture of propellants using certain of the higher boiling point, and certain of the lower boiling point haloalkanes so that the characteristics of the spray are as desired; neither being too coarse nor too fine. The choice of propellants is illustrated by certain examples which follow.

Additionally, a local anesthetic forms a valuable component of the mixture. (As used in this sense, the term includes analgesics.) Inasmuch as the antibiotic is usually sprayed on an injured area which is sensitive, a local anesthetic which desensitizes the area is an advantage. Such an anesthetic should be one which is preferably soluble in the propellant, or of such amorphous insoluble character that it does not form crystalline deposits around the valve nozzle. Suitable anesthetics which are soluble in the propellant include such materials as chlorobutanol, which is 1,1,1 trichloro-2 methyl-2 propanol. This material is in the anhydrous state and if present in the dispersing fluid to the extent of approximately ½% by weight, gives a local anesthetic action when sprayed on the surface of the skin or in the eye. As a result, the cooling effect of the propellant and the rapid effect of the local anesthetic give almost immediately a sense of relief to the subject. Even if sprayed in the eye, the material gives a soothing effect with almost instantaneous effect of the medicaments. Other local anesthetics which may be used include the derivatives of the ethyl esters of paraaminobenzoic acid such as benzocaine, and procaine.

For use on the surface of the skin, as for example, in the treatment of burns, a protective film is frequently an advantage. A suitable film-forming material such as ethyl cellulose which is soluble in the haloalkanes and which forms a protective covering may be present. From ½ to 2% of ethyl cellulose causes the antibiotic to adhere to the surface and prolongs its effect. The water insoluble ethyl cellulose also protects the surface mechanically. From 1 to 2% of a plasticizer for the ethyl cellulose, such as cetyl alcohol may also be present. This also forms an emollient coating on the treated area. Ethyl cellulose should not be present in materials which are used directly in the eye.

As illustrative of certain of the compositions within the scope of this invention which may be used for the therapeutic application of antibiotics, certain examples follow:

*Example 1*

Based on the final contents of the container a mixture was prepared of 48% by weight of dichlorotetrafluoroethane and 1% of calcium chlortetracycline prepared as described above, and 0.5% of anhydrous chlorobutanol. The calcium chlortetracycline and the chlorobutanol were ground with the dichlorotetrafluoroethane and filled into containers so that the container was half filled. These containers were refrigerated, and under refrigerated conditions there was then added 50% of difluorodichloromethane. While refrigeration was maintained the containers were sealed. 0.025 inch aperture valves were used. The containers after being filled, sealed and leak tested were then ready for use. The specific gravity of the propellant is 1.37. The preparations as thus constituted are stable for periods of at least about a year at room temperature under normal storage conditions. Just prior to use it is desirable that the container be shaken to resuspend any of the calcium chlortetracycline which may have settled. As thus prepared the formula was found very satisfactory for the treatment of pink eye in cattle. A small amount of the material was sprayed from 6 inches directly into the eyes of the cattle which were to be treated. In a short time the pink eye was found to respond favorably.

*Example 2*

A composition similar to Example 1 was prepared using calcium tetracycline as the antibiotic. The mixture was prepared under similar conditions and found to be equally satisfactory for the use in the treatment of pink eye in cattle.

It was noted that the specific gravity of the liquid mixture was approximately 1.37 and that at a room temperature of about 25° C. the vapor pressure of the mixture in the container was 25 pounds per square inch.

*Example 3*

A mixture was prepared containing 47 parts by weight of dichlorotetrafluoroethane, one part by weight of ethyl cellulose, 2 parts by weight of calcium chlortetracycline, and 0.5 part by weight of chlorobutanol. The composition was triturated and filled into pressure containers.

These were sealed, and under pressure were injected 49 parts by weight of dichlorodifluoromethane.

The thus-prepared composition was easily sprayed and formed a protective film on the surface of the skin in which the calcium chlortetracycline was held in close proximity to the surface of the skin so as to insure a prolonged antibiotic treatment. When applied to the surface of a burn in such thickness that the ethyl cellulose forms a film thereover a single treatment is normally sufficient to protect the surface of the burn during the period of healing. For particularly deep or drastic burns it may be necessary to apply additional treatments.

The sprayed coating was found effective in cases of chronic otitis, infectious dermatitis, summer eczema, ear infections, hematoma openings, infected external cavities, skin lesions and other skin and surface conditions in which antibiotic sensitive organisms were actually or potentially present.

*Example 4*

A mixture is prepared as in the preceding example using calcium tetracycline and containing additionally one part by weight of cetyl alcohol. The thus-prepared mixture when sprayed on the surface of the skin formed a flexible film so that it could be used on areas of the body which were subject to flexure, as for example the elbow or knee.

*Example 5*

Pressurized containers were prepared by triturating one part of calcium chlortetracycline, ½ part of chlorobutanol and 75 parts of trichlorofluoromethane. The mixture was ground together until thoroughly mixed and homogeneous and filled into pressurized containers. Thereto are added 25 parts of dichlorodifluoromethane under refrigerated conditions and the containers sealed. The containers were permitted to warm to room temperature and found to be satisfactory for spraying into the eyes of humans or animals.

I claim:

1. A method of preparing a pressurized container comprising mixing together a substantially amorphous antibiotic selected from the group consisting of calcium chlortetracycline and calcium tetracycline having particle sizes less than 15 microns and a haloalkane which may be handled directly under room conditions, filling the composition into a suitable metal container, and adding thereto a more volatile haloalkane.

2. A method of preparing a pressurized container comprising mixing together a substantially amorphous antibiotic selected from the group consisting of calcium chlortetracycline and calcium tetracycline having particle sizes less than 15 microns and a haloalkane which may be handled directly under room conditions, filling the composition into a suitable metal container, and adding thereto under refrigerated conditions a more volatile haloalkane, then sealing the container.

3. A method of preparing a pressurized container comprising mixing together a substantially amorphous antibiotic selected from the group consisting of calcium chlortetracycline and calcium tetracycline having particle sizes less than 15 microns and a haloalkane which may be handled directly under room conditions, filling the composition into a suitable metal container, sealing the container, then adding under pressure, a more volatile haloalkane.

4. A pressurized container containing a mixture of haloalkanes whose specific gravity is greater than approximately 1.37 and whose vapor pressure at 25° C. is between about 12 and about 100 pounds per square inch gauge and a substantially amorphous tetracycline group antibiotic selected from the group consisting of calcium chlortetracycline and calcium tetracycline having particle sizes less than 15 microns.

5. The composition of claim 11 which comprises a local anesthetic.

6. The composition of claim 5 comprising chlorobutanol as a local anesthetic.

7. The composition of claim 5 comprising from approximately 1 to 2% of ethyl cellulose.

8. The composition of claim 7 comprising from approximately 1 to 2% of cetyl alcohol.

9. A pressurized container containing 1 to 2% of calcium chlortetracycline the average particle size being less than 5 microns in diameter, approximately ½% of chlorobutanol and a mixture of approximately equal parts of dichlorotetrafluoroethane and dichlorodifluoromethane.

10. A pressurized container containing 1 to 2% of calcium chlortetracycline the average particle size being less than 5 microns in diameter, approximately ½% of chloretone, approximately 1% ethyl cellulose and a mixture of approximately equal parts of dichlorotetrafluoroethane and dichlorodifluoromethane.

11. A composition of matter comprising finely divided particles having a diameter of less than about 15 microns of a substantially amorphous antibiotic of the group consisting of calcium chlortetracycline and calcium tetracycline suspended in a liquid haloalkane whose specific gravity is greater than 1.73 and whose vapor pressure at 25° C. is between 12 and 100 lbs./square inch.

References Cited in the file of this patent

UNITED STATES PATENTS

| | | |
|---|---|---|
| 2,609,329 | Niedercorn | Sept. 2, 1952 |
| 2,621,014 | Efford | Dec. 9, 1952 |
| 2,699,054 | Conover | Jan. 11, 1955 |
| 2,727,665 | Charney | Dec. 20, 1955 |

FOREIGN PATENTS

| | | |
|---|---|---|
| 1,032,567 | France | Apr. 1, 1953 |
| 1,085,274 | France | July 21, 1954 |
| 7/1954 | Trinidad | Mar. 26, 1954 |

OTHER REFERENCES

Goodhue: "Low and Moderate Pressure Liquefied-Gas Aerosols." Ind. & Eng. Chem., July 1949, pages 1523–1527.

Du Pont: Technical Bull., June 1951, vol. 7, No. 2, pages 81–86, "Fine Chemicals Products for the Aerosol Industry."